(12) United States Patent
Tani et al.

(10) Patent No.: US 12,294,441 B2
(45) Date of Patent: May 6, 2025

(54) TERMINAL AND BASE STATION

(71) Applicant: Mitsubishi Electric Corporation, Tokyo (JP)

(72) Inventors: Shigenori Tani, Tokyo (JP); Koichi Natsume, Tokyo (JP); Akihiro Okazaki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 180 days.

(21) Appl. No.: 18/221,088

(22) Filed: Jul. 12, 2023

(65) Prior Publication Data
US 2023/0361858 A1    Nov. 9, 2023

Related U.S. Application Data

(63) Continuation of application No. PCT/JP2021/007929, filed on Mar. 2, 2021.

(51) Int. Cl.
*H04B 7/185* (2006.01)
*H04B 7/005* (2006.01)

(52) U.S. Cl.
CPC ......... *H04B 7/18502* (2013.01); *H04B 7/005* (2013.01)

(58) Field of Classification Search
CPC ............. H04B 7/18502; H04B 7/005; H04B 7/18508; H04W 56/0015; Y02D 30/70
See application file for complete search history.

(56) References Cited

U.S. PATENT DOCUMENTS

| | | | | |
|---|---|---|---|---|
| 8,019,284 B2* | 9/2011 | Monk | ................ | H04B 7/18506 455/63.1 |
| 11,632,194 B2* | 4/2023 | Jong | ..................... | H04L 1/0045 714/748 |
| 2010/0322150 A1* | 12/2010 | Wilcoxson | ......... | H04B 7/18506 370/321 |
| 2015/0055549 A1* | 2/2015 | Yamamoto | ......... | H04B 7/18543 370/316 |

(Continued)

FOREIGN PATENT DOCUMENTS

| | | |
|---|---|---|
| JP | 2002-330092 A | 11/2002 |
| JP | 2010-268132 A | 11/2010 |

(Continued)

OTHER PUBLICATIONS

International Search Report (PCT/ISA/210) issued in PCT/JP2021/007929, dated Jun. 8, 2021.

(Continued)

*Primary Examiner* — Rasheed Gidado
(74) *Attorney, Agent, or Firm* — Birch, Stewart, Kolasch & Birch, LLP

(57) ABSTRACT

A terminal to be installed in a machine having rotor blades in a communication system in which the terminal and a base station transmit and receive data via a relay station to and from each other, includes a rotor blade state monitoring unit that monitors a rotor blade state by measuring the timing at which the rotor blades block a communication path in midair between the relay station and the terminal, and a transceiver that transmits the rotor blade state to the base station and transmit the data using radio resources allocated by the base station.

20 Claims, 12 Drawing Sheets

(56) References Cited

U.S. PATENT DOCUMENTS

2019/0200376 A1 6/2019 Wilcoxson et al.
2024/0224108 A1 7/2024 Kaneko

FOREIGN PATENT DOCUMENTS

JP         2020-10214  A   1/2020
WO    WO 2008/115289 A3   9/2008

OTHER PUBLICATIONS

International Search Report and Written Opinion of the International Searching Authority for International Application No. PCT/JP2021/043277, dated Feb. 8, 2022, with English translation.
Japanese Office Action for Japanese Application No. 2022-519835, dated May 17, 2022, with an English translation.
Extended European Search Report for corresponding European Application No. 21928984.0, dated Mar. 18, 2024.
U.S. Appl. No. 18/604,900, filed Mar. 14, 2024.

* cited by examiner

TERMINAL AND BASE STATION

CROSS-REFERENCE TO RELATED APPLICATION

This application is a continuation application of International Application PCT/JP2021/007929, filed on Mar. 2, 2021, and designating the U.S., the entire contents of which are incorporated herein by reference.

BACKGROUND OF THE INVENTION

1. Field of the Invention

The present disclosure relates to a terminal to be installed in a helicopter, a base station, a control circuit, a storage medium, and a communication method.

2. Description of the Related Art

For wireless communication between a helicopter moving in a wide area and a ground station, a helicopter-installed satellite communication system has been put to practical use in which a communication apparatus installed in the helicopter and the ground station perform communication via a communication satellite. In the helicopter-installed satellite communication system, signals are intermittently blocked by rotor blades of the helicopter because the rotor blades are present on a communication path in midair between the communication apparatus installed in the helicopter and the communication satellite. A conventional helicopter-installed satellite communication system assigns a different frequency to each user. Each user occupies a specific frequency in time to perform communication. However, with increasing communication demand, it is desired that the helicopter-installed satellite communication system apply time-division multiplexing with high frequency utilization efficiency. Furthermore, to improve interconnectivity between the helicopter-installed satellite communication system and another system, it is desirable that the helicopter-installed satellite communication system can adopt a general-purpose communication apparatus conforming to standardization instead of a unique communication scheme.

To this problem, Japanese Patent Application Laid-open No. 2020-10214 discloses a technique to improve reliable transmission against blocking due to rotor blades by duplicating a transmission signal, delaying a duplicate signal, and transmitting the two-wave transmission signals so that the signal can be transmitted and received through space between the rotor blades.

However, the above conventional technique has a problem that under conditions where the rotor-blade blocking rate is high, it is a possibility that both of the two-wave transmission signals may be blocked by the rotor blades.

SUMMARY OF THE INVENTION

In order to solve the above problem and achieve the object, the present disclosure is a terminal to be installed in a machine having rotor blades in a communication system in which the terminal and a base station transmit and receive data via a relay station to and from each other. The terminal includes a rotor blade state monitoring unit to monitor a rotor blade state by measuring timing at which the rotor blades block a communication path in midair between the relay station and the terminal and a transceiver to transmit the rotor blade state to the base station and transmit the data using radio resources allocated by the base station.

DETAILED DESCRIPTION OF THE PREFERRED EMBODIMENTS

Hereinafter, a terminal, a base station, a control circuit, a storage medium, and a communication method according to embodiments of the present disclosure will be described in detail with reference to the drawings.

First Embodiment

Figure 1:
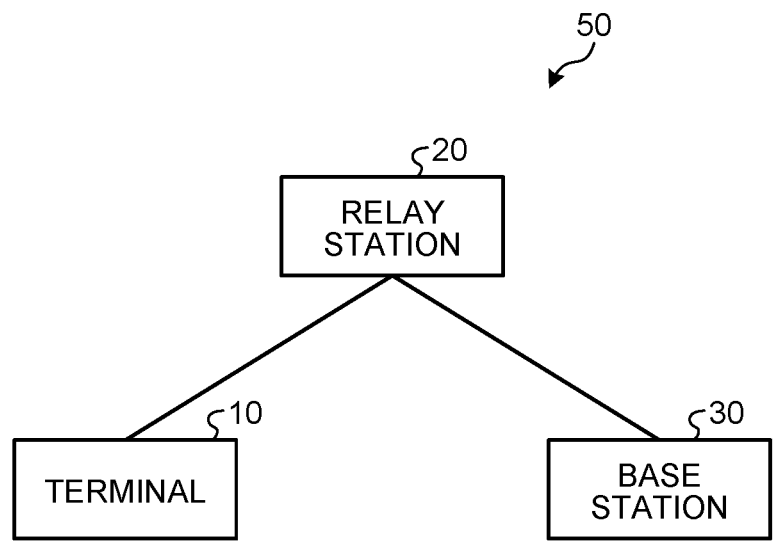
FIG. 1 is a diagram illustrating a configuration example of a communication system according to a first embodiment.

FIG. 1 is a diagram illustrating a configuration example of a communication system 50 according to a first embodiment. The communication system 50 includes a terminal 10, a relay station 20, and a base station 30. In the communication system 50, the terminal 10 and the base station 30 are wirelessly connected via the relay station 20 to transmit and receive data and the like. The terminal 10 is a communication apparatus installed in a machine having rotor blades, specifically, a helicopter (not illustrated). The relay station 20 is a communication apparatus that relays wireless communication performed by the terminal 10 and the base station 30. The relay station 20 may be a communication satellite or a mobile object staying in the air at a high altitude. Hereinafter, a case where the relay station 20 is a communication satellite will be described as an example. The base station 30 is a communication apparatus installed on the ground. The base station 30 may be a communication apparatus fixed on the ground or a movable communication apparatus. The communication system 50 is a helicopter-installed satellite communication system in which the terminal 10 and the base station 30 perform wireless communication via the relay station 20.

In the following description, in the communication system 50, communication from the base station 30 to the terminal 10 via the relay station 20 is referred to as a forward link, and communication from the terminal 10 to the base station 30 via the relay station 20 is referred to as a return link.

Figure 2:
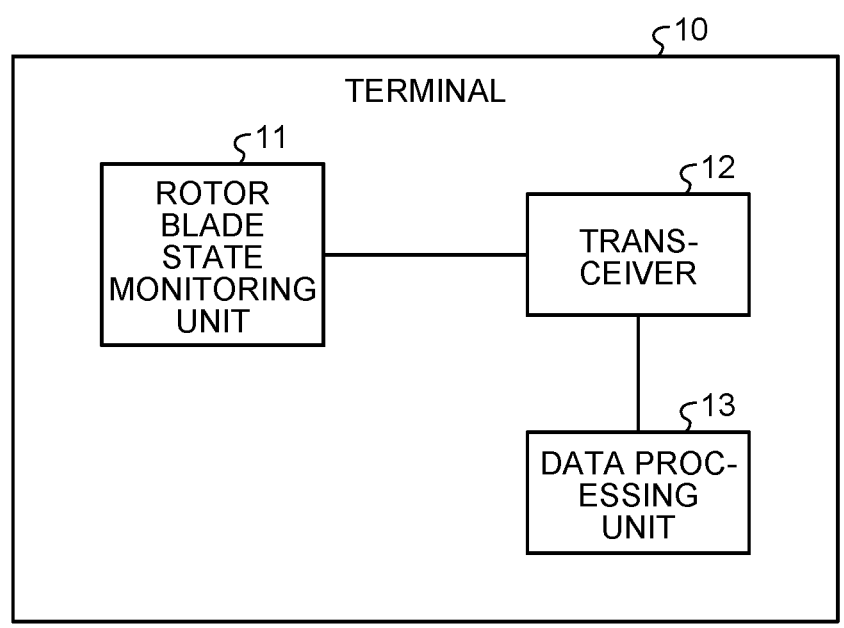
FIG. 2 is a block diagram illustrating a configuration example of a terminal according to the first embodiment.

Next, configurations and operations of the terminal 10 and the base station 30 will be described. FIG. 2 is a block diagram illustrating a configuration example of the terminal 10 according to the first embodiment. The terminal 10 includes a rotor blade state monitoring unit 11, a transceiver 12, and a data processing unit 13. The rotor blade state monitoring unit 11 monitors a rotor blade state by measuring the timing at which the rotor blades of the helicopter block a communication path in midair between the relay station 20 and the terminal 10. The transceiver 12 transmits, to the base station 30, the rotor blade state, a resource request for requesting radio resources, and data etc. using radio resources allocated from the base station 30. The transceiver 12 receives, from the base station 30, data, resource notification of the allocation of radio resources in response to a resource request, etc. The data processing unit 13 performs management of data to be transmitted to the base station 30, encoding and modulation of data to be transmitted to the base station 30, demodulation and decoding of data received from the base station 30, etc.

Figure 3:
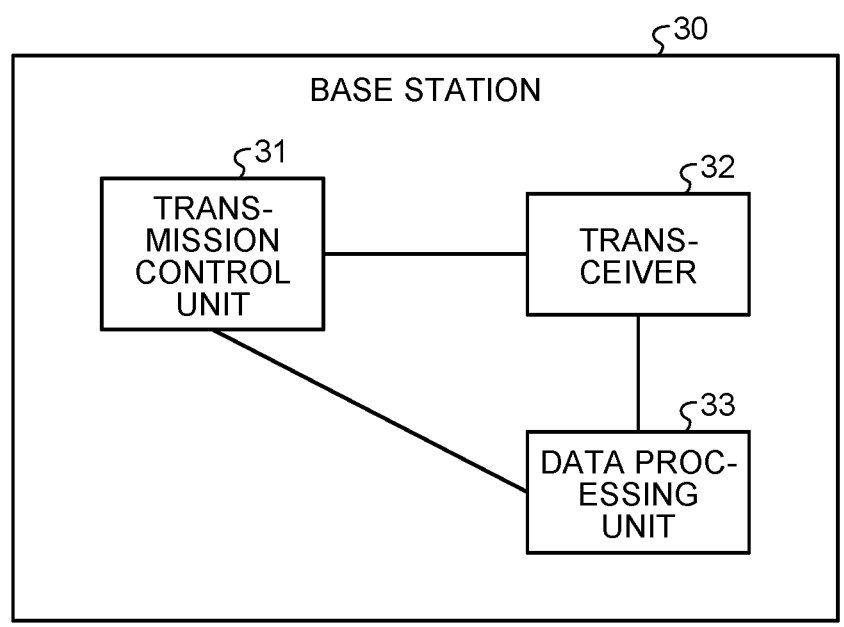
FIG. 3 is a block diagram illustrating a configuration example of a base station according to the first embodiment.

FIG. 3 is a block diagram illustrating a configuration example of the base station 30 according to the first embodiment. The base station 30 includes a transmission control unit 31, a transceiver 32, and a data processing unit 33. When there is a resource request from the terminal 10, the transmission control unit 31 determines radio resources to be allocated to the terminal 10, using the rotor blade state etc. The transceiver 32 transmits data, resource notification of the allocation of radio resources in response to a resource request, etc. to the terminal 10. The transceiver 32 receives the rotor blade state, a resource request for requesting radio resources, data, etc. from the terminal 10. The data processing unit 33 performs management of data to be transmitted to the terminal 10, encoding and modulation of data to be transmitted to the terminal 10, demodulation and decoding of data received from the terminal 10, etc.

Figure 4:
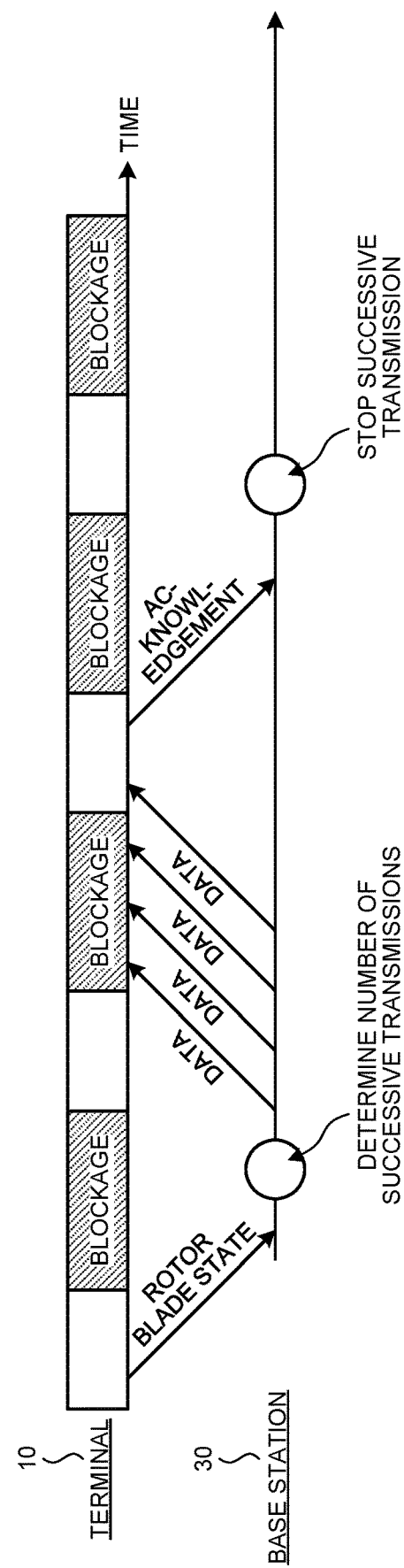
FIG. 4 is a diagram illustrating operations of the terminal and the base station at the time of a forward link according to the first embodiment.

First, operations of the terminal 10 and the base station 30 at the time of a forward link will be described. FIG. 4 is a diagram illustrating operations of the terminal 10 and the base station 30 at the time of a forward link according to the first embodiment. First, in the terminal 10, the rotor blade state monitoring unit 11 monitors the rotor blade state. Specifically, the rotor blade state monitoring unit 11 measures the timing at which the rotor blades block a communication path in midair between the relay station 20 and the terminal 10 as the monitoring of the rotor blade state. The blocking timing is, specifically, a blocking cycle, a blocking time, a blocking rate, the temporal stability of the blocking time, or the like. The temporal stability is, for example, variance. The rotor blade state monitoring unit 11 can measure the blocking timing by a combination of existing techniques, using the attitude of the helicopter, position information, detected information on the rotor blades, the position of the relay station 20 that is a communication satellite, etc. The timing at which the rotor blades block a communication path in midair between the relay station 20 and the terminal 10, that is, the rotor blade state includes at least one of the above-described blocking cycle, blocking time, blocking rate, or temporal stability of the blocking time.

The transceiver 12 of the terminal 10 transmits the timing at which the rotor blades block a communication path in midair between the relay station 20 and the terminal 10 measured by the rotor blade state monitoring unit 11 as the rotor blade state to the base station 30 via the relay station 20. Communication between the terminal 10 and the base station 30 is performed via the relay station 20 as described above. However, hereinafter, in order to simplify the description, the description "via the relay station 20" will be omitted in the following description. When the rotor blade state is transmitted to the base station 30, in a case where radio resources for an individual return link, for example, a transmission possible time, a frequency, or the like has been allocated from the transmission control unit 31 of the base station 30 to the terminal 10, the transceiver 12 transmits the rotor blade state at a time without blockage by the rotor blades during the transmission possible time of the allocated radio resources. In a case where radio resources for an individual return link have not been allocated from the transmission control unit 31 of the base station 30 to the terminal 10, the transceiver 12 may transmit the rotor blade state, using radio resources allocated to contention-based random access or the like which have been determined by the transmission control unit 31 in advance.

In the base station 30, the transceiver 32 receives the rotor blade state from the terminal 10. The transmission control unit 31 determines the number of times that data to be transmitted to the terminal 10 on a forward link managed by the data processing unit 33 is duplicated and the transceiver 32 successively transmits the date, that is, the number of successive transmissions, based on the data amount of the data to be transmitted to the terminal 10 on the forward link, the rotor blade state, a wireless communication rate satisfying a desired communication quality, a required data error rate, etc. The desired communication quality is, for example, an error rate. The required data error rate is, for example, a packet error rate. For example, when the transceiver 32 can transmit successively without any gaps in time, the transmission control unit 31 determines the number of successive transmissions so that the following condition is satisfied that (the time of blocking by the rotor blades)<(the radio frame length)×(the number of successive transmissions). In other words, for example, when the transceiver 32 can transmit successively without any gaps in time, the transmission control unit 31 determines the number of successive transmissions so that the time of blocking by the rotor blades is smaller than a value obtained by multiplying the radio frame length by the number of successive transmissions. The radio frame length is the length of a radio frame used to transmit data. This allows the terminal 10 to receive at least one radio frame, that is, at least one piece of data at a time without blocking by the rotor blades.

When the transceiver 32 is only allowed to transmit successively at the Internet Protocol (IP) packet level by a black box, the transceiver 32 may not be able to successively transmit data without any gaps in time. In this case, the transmission control unit 31 determines the number of successive transmissions so that the following condition is satisfied that {1−(the rate of blocking by the rotor blades)^(the number of successive transmissions)}>(a desired error rate). In other words, the transmission control unit 31 determines the number of successive transmissions so that a value obtained by subtracting, from 1, a value represented by a power with the rate of blocking by the rotor blades as "the base" and the number of successive transmissions as "the exponent" is greater than a desired error rate. The transceiver 32 duplicates and transmits an IP packet for the number of successive transmissions that satisfies {1−(the rate of blocking by the rotor blades)^(the number of successive transmissions)}>(the desired error rate). This allows the terminal 10 to receive a radio frame, that is, data with a probability higher than or equal to the desired error rate. Furthermore, because the rotor blade state may vary depending on the attitude of the helicopter in which the terminal 10 is installed, when determining the number of successive transmissions, the transmission control unit 31 may multiply the number of successive transmissions by a correction coefficient based on the stability of the rotor blade state, for example, the variance of the blocking cycle, the blocking rate, or the like so as to correct the number of successive transmissions. For example, when the variance is large, the transmission control unit 31 makes a correction to increase the number of successive transmissions, thereby allowing an improvement in the reliable transmission of data from the base station 30 to the terminal 10. The transceiver 32 duplicates and successively transmits data to the terminal 10 for the number of successive transmissions determined by the transmission control unit 31.

In the terminal 10, the transceiver 12 receives data from the base station 30. The data processing unit 13 demodulates and decodes the data received by the transceiver 12, and transmits an acknowledgement to the base station 30 via the transceiver 12.

When the transceiver 32 of the base station 30 receives an acknowledgement from the terminal 10 while successively transmitting data, the transceiver 32 of the base station 30 may stop successively transmitting the data since further successive transmission of the data is unnecessary. Furthermore, because the transceiver 12 of the terminal 10 may redundantly receive two or more pieces of the same data successively transmitted from the base station 30, the transceiver 12 may check the received data for duplication and discard data that is a duplicate of received data.

In a case where the terminal 10, the relay station 20, and the base station 30 conform to a mobile phone standard, for example, the 3rd Generation Partnership Project (3GPP), the base station 30 can successively transmit data by setting DL_REPETITION_NUMBER defined in 3GPP to the number of successive transmissions determined above. In a case where the terminal 10, the relay station 20, and the base station 30 conform to Digital Video Broadcasting (DVB)-Satellite-Second Generation (S2) or DVB-Satellite-Second Generation Extensions (S2X), the above-described radio frame is a PLFRAME, and the base station 30 may duplicate and successively transmit a PLFRAME. That is, the transceiver 32 of the base station 30 duplicates and successively transmits a PLFRAME defined in DVB-S2 or DVB-S2X for the number of successive transmissions.

Figure 5:
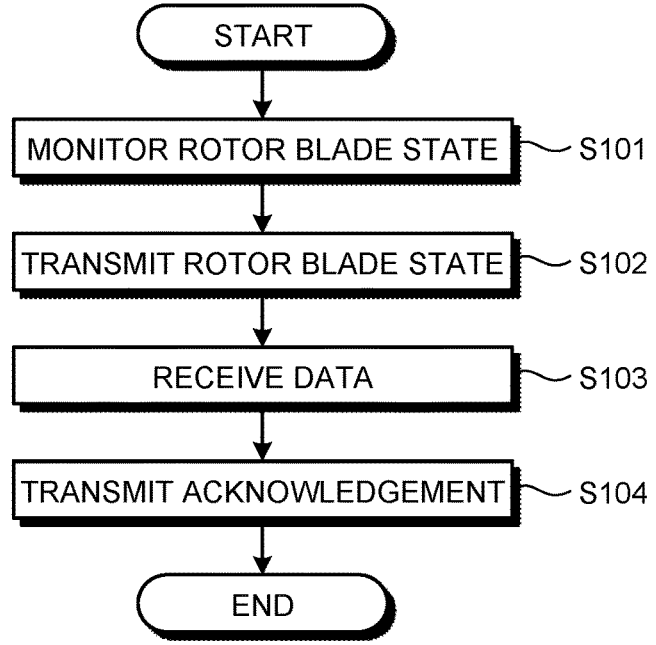
FIG. 5 is a flowchart illustrating the operation of the terminal at the time of a forward link according to the first embodiment.

FIG. 5 is a flowchart illustrating the operation of the terminal 10 at the time of a forward link according to the first embodiment. In the terminal 10, the rotor blade state monitoring unit 11 monitors the rotor blade state (step S101). The transceiver 12 transmits the rotor blade state to the base station 30 (step S102). The transceiver 12 receives data from the base station 30 (step S103). The data processing unit 13 transmits an acknowledgement to the base station 30 via the transceiver 12 (step S104).

Figure 6:
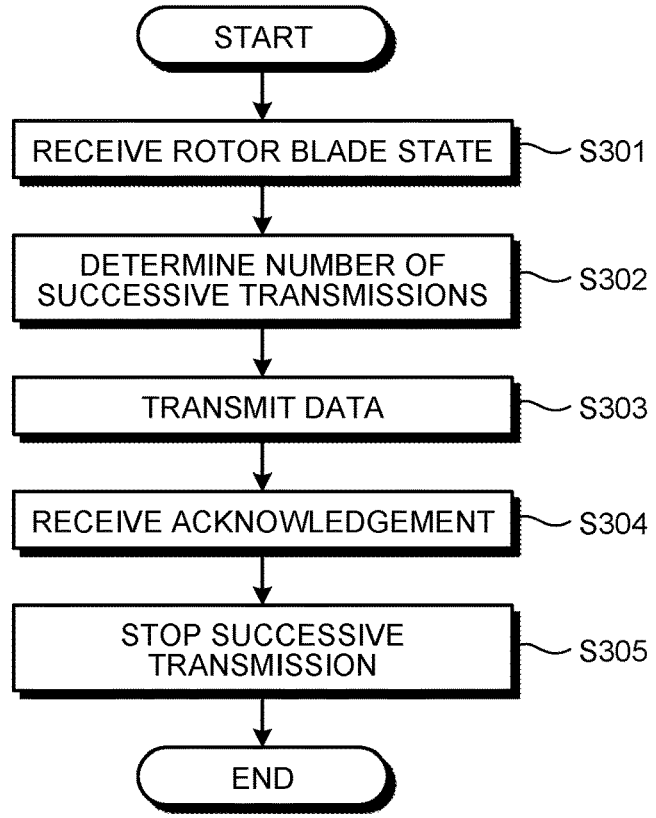
FIG. 6 is a flowchart illustrating the operation of the base station at the time of a forward link according to the first embodiment.

FIG. 6 is a flowchart illustrating the operation of the base station 30 at the time of a forward link according to the first embodiment. In the base station 30, the transceiver 32 receives the rotor blade state from the terminal 10 (step S301). The transmission control unit 31 determines the number of successive transmissions at the time of transmitting data to the terminal 10 (step S302). The transceiver 32 transmits the data to the terminal 10 for the number of successive transmissions determined by the transmission control unit 31 (step S303). The transceiver 32 receives an acknowledgement from the terminal 10 (step S304). At this time, the transceiver 32 stops successively transmitting the data if the transceiver 32 is successively transmitting the data (step S305).

Figure 7:
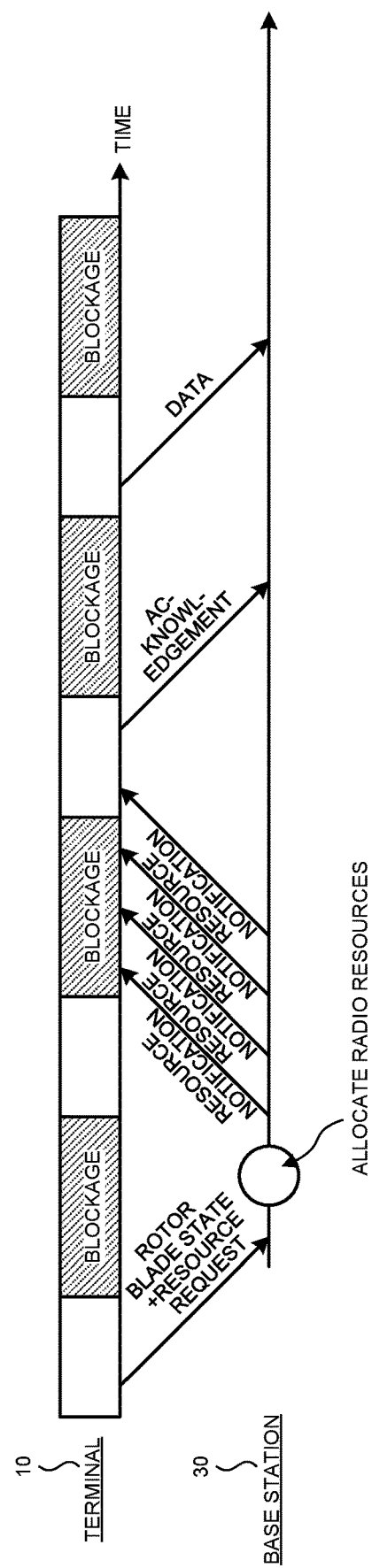
FIG. 7 is a diagram illustrating operations of the terminal and the base station at the time of a return link according to the first embodiment.

Next, operations of the terminal 10 and the base station 30 at the time of a return link will be described. FIG. 7 is a diagram illustrating operations of the terminal 10 and the base station 30 at the time of a return link according to the first embodiment. Similarly to the case of performing communication on a forward link, in the terminal 10, the rotor blade state monitoring unit 11 monitors the rotor blade state. The data processing unit 13 monitors the data rate of data to be transmitted by the terminal 10. Then, the transceiver 12 transmits, to the base station 30, the rotor blade state and a resource request for requesting radio resources necessary for satisfying the data rate. The radio resources requested in the resource request are radio resources when the terminal 10 transmits the data on a return link, and are, for example, a time, a frequency, a transmission rate, the amount of storage of data in a buffer, or the like. Here, by setting a transmission rate requested in the resource request to, for example, a value obtained by dividing the data rate by (1−the blocking rate), the terminal 10 can request a higher transmission rate when the blocking rate is higher, to transmit desired data in a non-blocking interval. The value obtained by dividing the data rate by (1−the blocking rate) is also referred to as a value obtained by dividing the data rate by a value obtained by subtracting the blocking rate from 1. In a case where information requested in the resource request is not the transmission rate, the terminal 10 may request, as information requested in the resource request, a value obtained by converting the transmission rate into information equivalent to the transmission rate such as a time or a frequency, or a value obtained by converting the transmission rate into the amount of storage of data that is the amount of data that can be transmitted in a unit time. Similarly to the base station 30 at the time of a forward link, when the rate of blocking by the rotor blades varies depending on the attitude of the helicopter in which the terminal 10 is installed, the transceiver 12 of the terminal 10 may multiply the transmission rate by a correction coefficient, based on the stability of the rotor blade state.

In the base station 30, the transceiver 32 receives the rotor blade state and the resource request from the terminal 10. The transmission control unit 31 determines a time in which the terminal 10 can transmit on a return link, based on the rotor blade state and the resource request, and allocates radio resources for the terminal 10 to transmit the data. The transceiver 32 transmits the radio resources allocated by the transmission control unit 31 as resource notification to the terminal 10. To prevent the resource notification itself from being blocked by the rotor blades, the transceiver 32 may determine the number of successive transmissions of the resource notification, based on the rotor blade state and successively transmit the resource notification.

In the terminal 10, when the transceiver 12 receives the resource notification from the base station 30, the transceiver 12 returns an acknowledgement to the resource notification to the base station 30. The transceiver 12 extracts the data to be transmitted from the data processing unit 13. When a time, a frequency, or the like in which the terminal 10 can transmit on a return link is allocated as the radio resources by the resource notification from the base station 30, the transceiver 12 transmits the data to the base station 30 at a time without blockage by the rotor blades in the time or the frequency in which transmission is possible.

Figure 8:
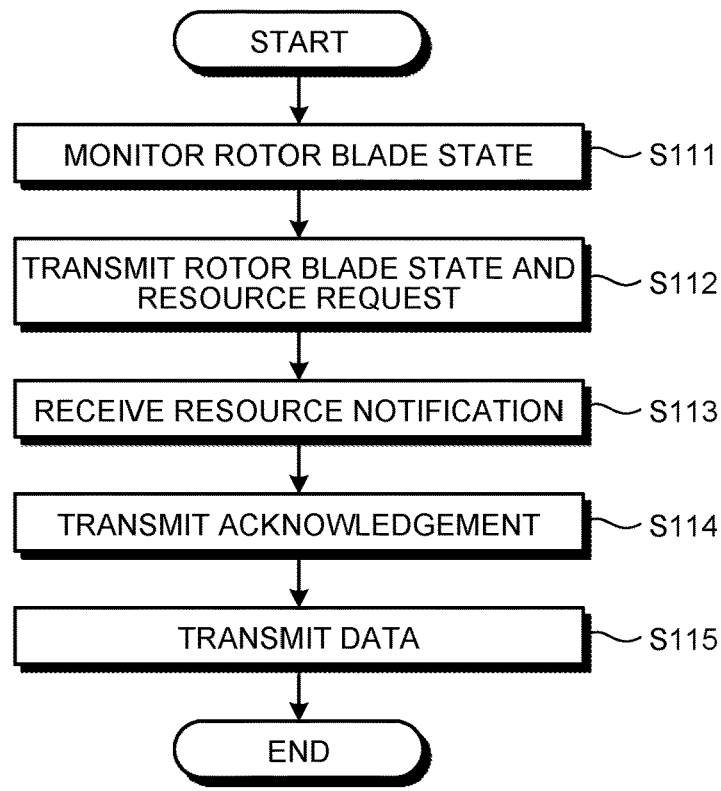
FIG. 8 is a flowchart illustrating the operation of the terminal at the time of the return link according to the first embodiment.

FIG. 8 is a flowchart illustrating the operation of the terminal 10 at the time of a return link according to the first embodiment. In the terminal 10, the rotor blade state monitoring unit 11 monitors the rotor blade state (step S111). The transceiver 12 transmits, to the base station 30, the rotor blade state and a resource request for requesting necessary radio resources (step S112). Upon receiving resource notification from the base station 30 (step S113), the transceiver 12 transmits an acknowledgement to the base station 30 (step S114). The transceiver 12 extracts data to be transmitted from the data processing unit 13 and transmits the data based on the resource notification (step S115).

Figure 9:
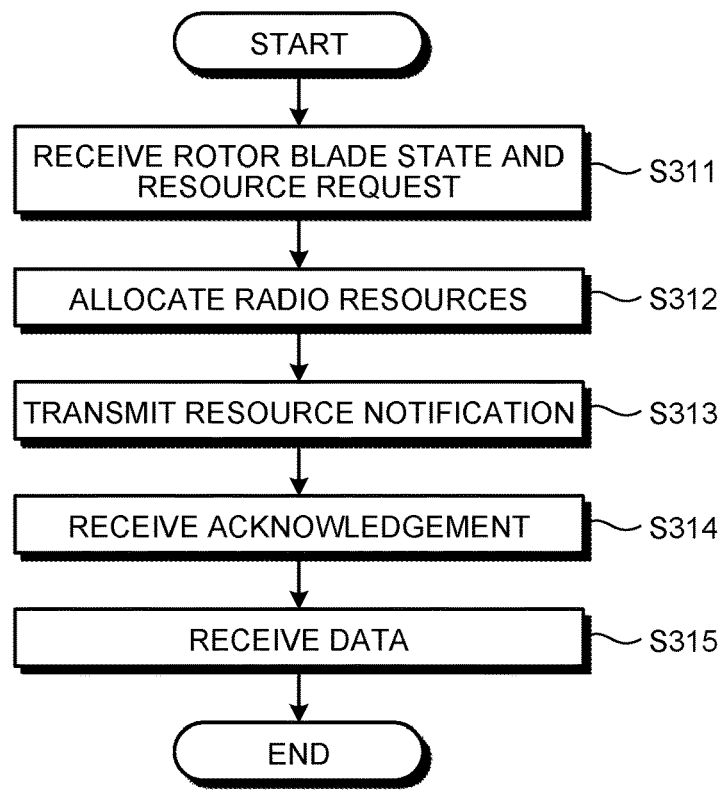
FIG. 9 is a flowchart illustrating the operation of the base station at the time of the return link according to the first embodiment.

FIG. 9 is a flowchart illustrating the operation of the base station 30 at the time of a return link according to the first embodiment. In the base station 30, the transceiver 32 receives the rotor blade state and a resource request from the terminal 10 (step S311). Based on the rotor blade state and the resource request, the transceiver 32 allocates radio resources to the terminal 10 (step S312), and transmits resource notification to the terminal 10 (step S313). The transceiver 32 receives an acknowledgement from the terminal 10 (step S314), and then receives data from the terminal 10 (step S315).

Next, a hardware configuration of the terminal 10 will be described. In the terminal 10, the transceiver 12 is communication equipment. The rotor blade state monitoring unit 11 and the data processing unit 13 are implemented by processing circuitry. The processing circuitry may be a processor that executes a program stored in memory and the memory, or may be dedicated hardware. The processing circuitry is also referred to as a control circuit.

Figure 10:
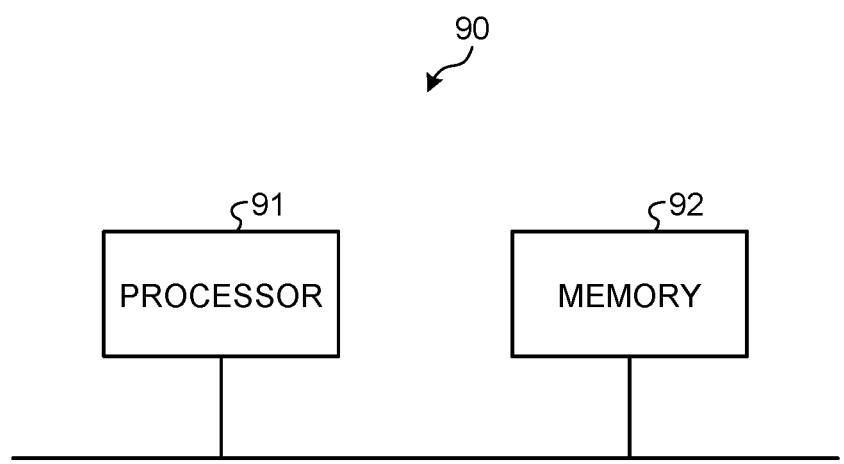
FIG. 10 is a diagram illustrating a configuration example of processing circuitry included in the terminal when a processor and memory implement the processing circuitry according to the first embodiment.

FIG. 10 is a diagram illustrating a configuration example of processing circuitry 90 when a processor 91 and memory 92 implement processing circuitry included in the terminal 10 according to the first embodiment. The processing circuitry 90 illustrated in FIG. 10 is a control circuit and includes the processor 91 and the memory 92. When the processing circuitry 90 consists of the processor 91 and the memory 92, each function of the processing circuitry 90 is implemented by software, firmware, or a combination of software and firmware. The software or firmware is described as a program and stored in the memory 92. In the processing circuitry 90, the processor 91 reads and executes the program stored in the memory 92, thereby implementing the functions. That is, the processing circuitry 90 includes the memory 92 for storing the program that results in the execution of the processing in the terminal 10. This program can be said to be a program for causing the terminal 10 to perform the functions implemented by the processing circuitry 90. This program may be provided by a storage medium in which the program is stored, or may be provided by another means such as a communication medium.

The program can be said to be a program that causes the terminal 10 to perform a first step in which the rotor blade state monitoring unit 11 monitors the rotor blade state by measuring the timing at which the rotor blades block a communication path in midair between the relay station 20 and the terminal 10, and a second step in which the transceiver 12 transmits the rotor blade state to the base station 30 and transmits data using radio resources allocated from the base station 30.

Here, the processor 91 is, for example, a CPU, a processing unit, an arithmetic unit, a microprocessor, a microcomputer, a digital signal processor (DSP), or the like. The memory 92 corresponds, for example, to nonvolatile or volatile semiconductor memory such as random-access memory (RAM), read-only memory (ROM), flash memory, an erasable programmable ROM (EPROM), or an electrically EPROM (EEPROM) (registered trademark), or a magnetic disk, a flexible disk, an optical disk, a compact disk, a mini disk, a digital versatile disc (DVD), or the like.

Figure 11:
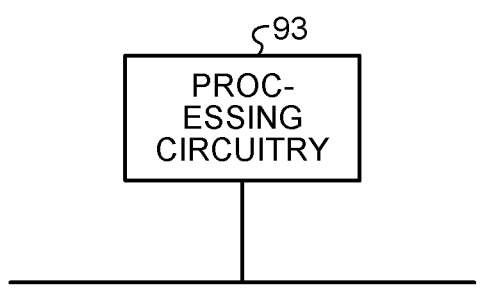
FIG. 11 is a diagram illustrating an example of processing circuitry included in the terminal when dedicated hardware constitutes the processing circuitry according to the first embodiment.

FIG. 11 is a diagram illustrating an example of processing circuitry 93 when dedicated hardware constitutes the processing circuitry included in the terminal 10 according to the first embodiment. The processing circuitry 93 illustrated in FIG. 11 corresponds, for example, to a single circuit, a combined circuit, a programmed processor, a parallel-programmed processor, an application-specific integrated circuit (ASIC), a field-programmable gate array (FPGA), or a combination of these. The processing circuitry may be implemented partly by dedicated hardware and partly by software or firmware. Thus, the processing circuitry can implement the above-described functions by dedicated hardware, software, firmware, or a combination of these.

The hardware configuration of the base station 30 is the same as the hardware configuration of the terminal 10. In the base station 30, the transceiver 32 is communication equipment. The transmission control unit 31 and the data processing unit 33 are implemented by processing circuitry. The processing circuitry may be a processor that executes a program stored in memory and the memory, or may be dedicated hardware.

As described above, according to the present embodiment, the terminal 10 monitors the rotor blade state and transmits the rotor blade state to the base station 30. In a case of forward-link communication, the base station 30 determines the number of successive transmissions of data based on the rotor blade state and successively transmits the data for the number of successive transmissions. In a case of return-link communication, the base station 30 allocates radio resources with which the terminal 10 can transmit data, based on the rotor blade state. The terminal 10 transmits the data at a timing without blockage by the rotor blades in the allocated radio resources. Consequently, in wireless communication using time-division multiplexing, the terminal 10 and the base station 30 can improve the reliable transmission of signals such as data and resource notification, under conditions where blockage by the rotor blades occurs.

Second Embodiment

In the first embodiment, the base station 30 allocates radio resources to the terminal 10, considering radio waves being blocked by the rotor blades, so that the base station 30 successively transmits data on a forward link, and the terminal 10 transmits data only in a non-blocking interval on a return link. However, the first embodiment, in which radio resources are redundantly allocated, has a problem of low frequency utilization efficiency. Therefore, a second embodiment will describe a method to achieve communication that avoids blockage by the rotor blades without allocating redundant radio resources.

Figure 12:
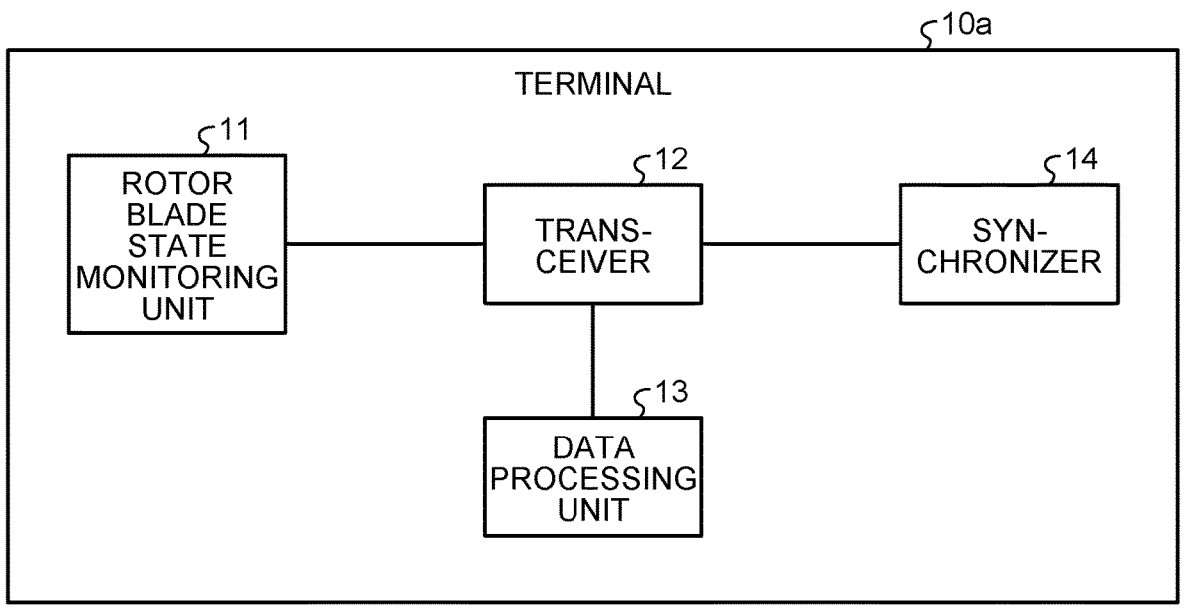
FIG. 12 is a block diagram illustrating a configuration example of a terminal according to a second embodiment.
Figure 13:
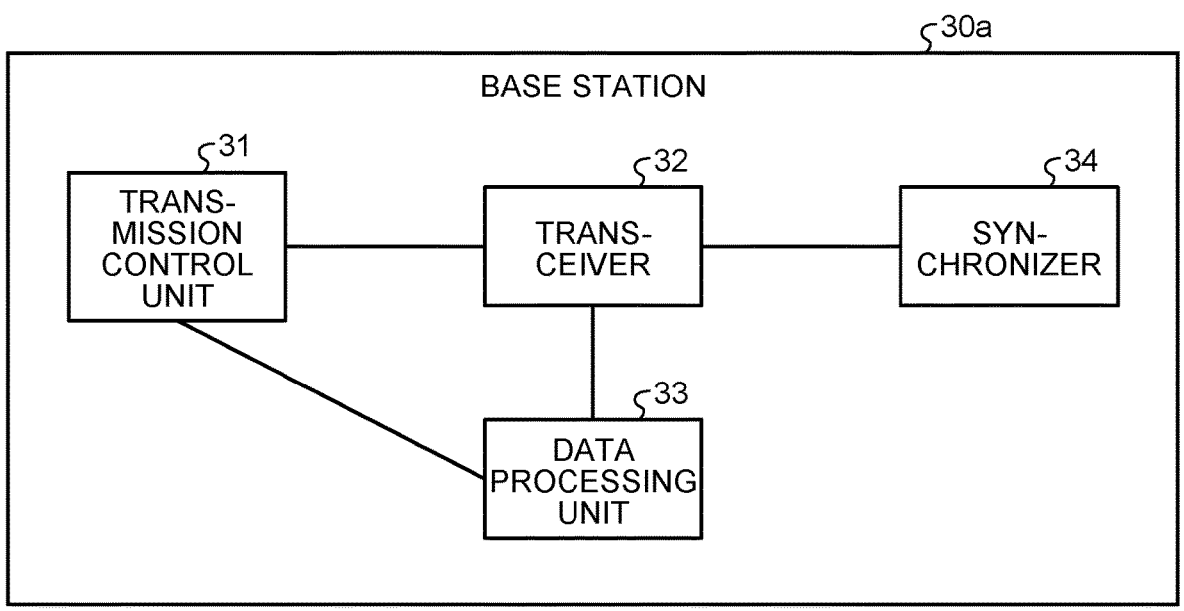
FIG. 13 is a block diagram illustrating a configuration example of a base station according to the second embodiment.

FIG. 12 is a block diagram illustrating a configuration example of a terminal 10*a* according to the second embodiment. The terminal 10*a* includes the rotor blade state monitoring unit 11, the transceiver 12, the data processing unit 13, and a synchronizer 14. The terminal 10*a* is obtained by adding the synchronizer 14 to the terminal 10 of the first embodiment illustrated in FIG. 2. FIG. 13 is a block diagram illustrating a configuration example of a base station 30*a* according to the second embodiment. The base station 30*a* includes the transmission control unit 31, the transceiver 32, the data processing unit 33, and a synchronizer 34. The base station 30*a* is obtained by adding the synchronizer 34 to the base station 30 of the first embodiment illustrated in FIG. 3. The synchronizer 14 of the terminal 10*a* and the synchronizer 34 of the base station 30*a* manage times to uniquely determine transmission and reception timings by correcting a delay difference due to the geometry of the terminal 10*a* and the base station 30*a*. That is, the synchronizer 14 of the terminal 10*a* and the synchronizer 34 of the base station 30*a* correct a delay difference in the transmission or reception of data etc. between the terminal 10*a* and the base station 30*a*. A state in which synchronization between the synchronizer 14 of the terminal 10*a* and the synchronizer 34 of the base station 30*a* is achieved is, for example, a state in which timing alignment in 3GPP is established.

Figure 14:
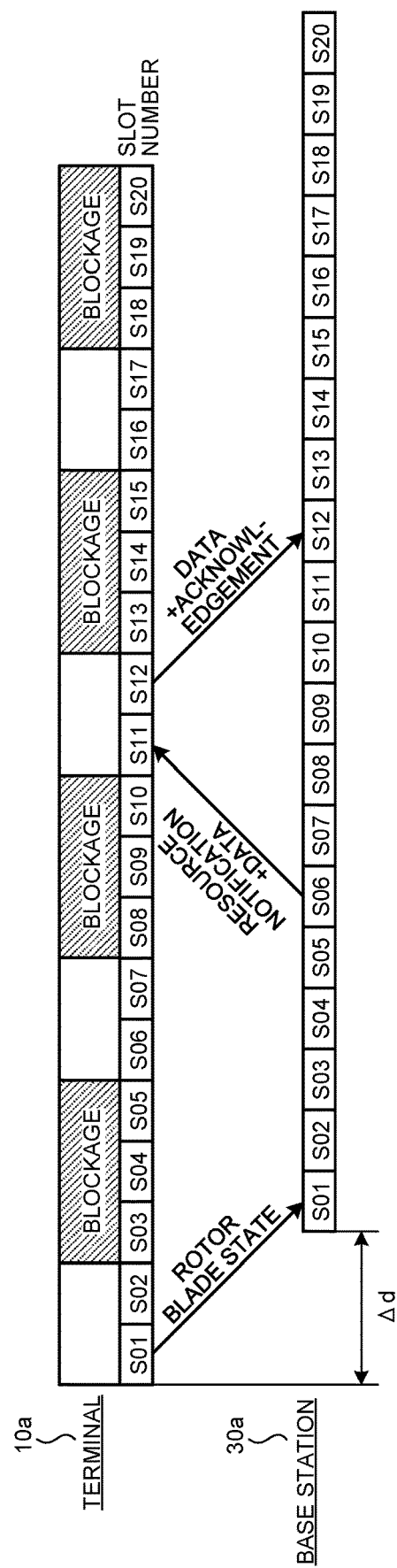
FIG. 14 is a diagram illustrating operations of the terminal and the base station according to the second embodiment.

FIG. 14 is a diagram illustrating operations of the terminal 10*a* and the base station 30*a* according to the second embodiment. The synchronizer 14 of the terminal 10*a* and the synchronizer 34 of the base station 30*a* manage times with predetermined slot numbers, and have grasped a delay difference Δd due to the geometry. In the example of FIG. 14, the delay difference Δd corresponds to 2.5 slots. A time at which the base station 30*a* receives data etc. transmitted by the terminal 10*a* in slot S01 after the delay difference Δd is slot S01 at the base station 30*a*. The delay difference Δd when data etc. are transmitted from the base station 30*a* to the terminal 10*a* is also 2.5 slots. Thus, in order for the terminal 10*a* to receive data etc. in slot S11, the base station 30*a* can transmit the data etc. in slot S06.

Figure 15:
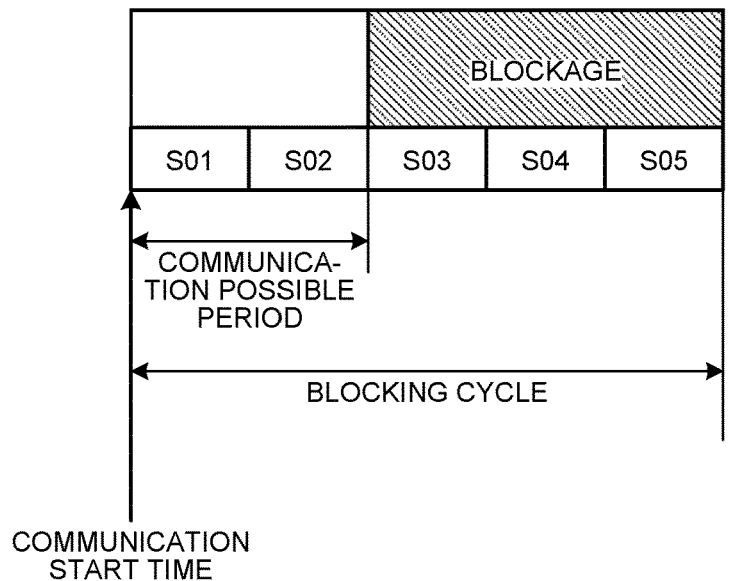
FIG. 15 is a diagram illustrating an example in which information on a rotor blade state is associated with slot numbers in the terminal according to the second embodiment.

First, in the terminal 10*a*, the rotor blade state monitoring unit 11 monitors a rotor blade state. The transceiver 12 transmits the rotor blade state to the base station 30*a*. Here, as in the first embodiment, the rotor blade state is a blocking cycle, a blocking time, a blocking rate, the temporal stability of the blocking time, or the like. The blocking cycle and the blocking time are associated with slot numbers. FIG. 15 is a diagram illustrating an example in which information on the rotor blade state is associated with slot numbers in the terminal 10*a* according to the second embodiment. For example, a format of a communication start time, a communication possible period, and a blocking cycle is defined, and the communication start time is associated with slot S01, the communication possible period with two slots, and the blocking cycle with five slots. Although not illustrated in FIG. 15, the blocking time can be obtained by (the blocking cycle)−(the communication possible period)=(three slots). In the second embodiment, the rotor blade state transmitted from the terminal 10*a* to the base station 30*a* includes at least one of the communication start time, the communication possible period, and the blocking cycle. In a case where the present embodiment is implemented based on 3GPP standards, the communication start time may be adapted to drxStartOffset in 3GPP, the communication possible period to onDurationTimer in 3GPP, and the blocking cycle to DRXcycle in 3GPP.

At the time of transmission of the rotor blade state to the base station 30*a*, when radio resources for an individual return link, for example, a transmission possible time, a frequency, or the like has been allocated by the transmission control unit 31 of the base station 30*a* to the terminal 10*a*, the transceiver 12 transmits the rotor blade state at a time without blockage by the rotor blades among the allocated radio resources. When radio resources for an individual return links have not been allocated by the transmission control unit 31 of the base station 30*a* to the terminal 10*a*, the transceiver 12 may transmit the rotor blade state, using radio resources allocated to contention-based random access or the like which have been determined by the transmission control unit 31 in advance.

In the base station 30*a*, the transceiver 32 receives the rotor blade state from the terminal 10*a*. The transmission control unit 31 estimates a period during which the terminal 10*a* can receive data etc., that is, a communication possible period during which communication is not blocked by the rotor blades, from the data amount of data to be transmitted to the terminal 10*a* on a forward link managed by the data processing unit 33, the rotor blade state, etc. The transceiver 32 transmits the forward-link data to the terminal 10*a* so that the terminal 10*a* can receive the forward-link data during the communication possible period estimated by the transmission control unit 31. When the transceiver 32 has received a resource request for a return link from the terminal 10*a*, the transmission control unit 31 determines resource allocation for the terminal 10*a* to transmit data in the communication possible period. The transceiver 32 transmits resource notification for providing a notification of radio resources allocated by the transmission control unit 31 so that the terminal 10*a* can receive the resource notification during the communication possible period.

In the terminal 10*a*, the transceiver 12 receives the data and the resource notification from the base station 30*a*. The data processing unit 13 transmits an acknowledgement to the received data to the base station 30*a* via the transceiver 12. When there is data to be transmitted on a return link and resource notification has been received from the base station 30*a*, the transceiver 12 transmits the data to the base station 30*a* using radio resources allocated by the resource notification.

In the present embodiment, since the terminal 10*a* and the base station 30*a* can grasp the state of the rotor blades at a time at which they are synchronized with each other, the same processing as that of common intermittent transmission and reception can be performed. Thus, the terminal 10*a* can stop transmitting and receiving functions in a period other than an interval for intermittent transmission and reception, that is, other than the communication possible period. For example, if the terminal 10*a* manages a standby state with states such as Active, Idle, and Dormant, the terminal 10a may transition to the Idle mode in a period other than the communication possible period.

Figure 16:
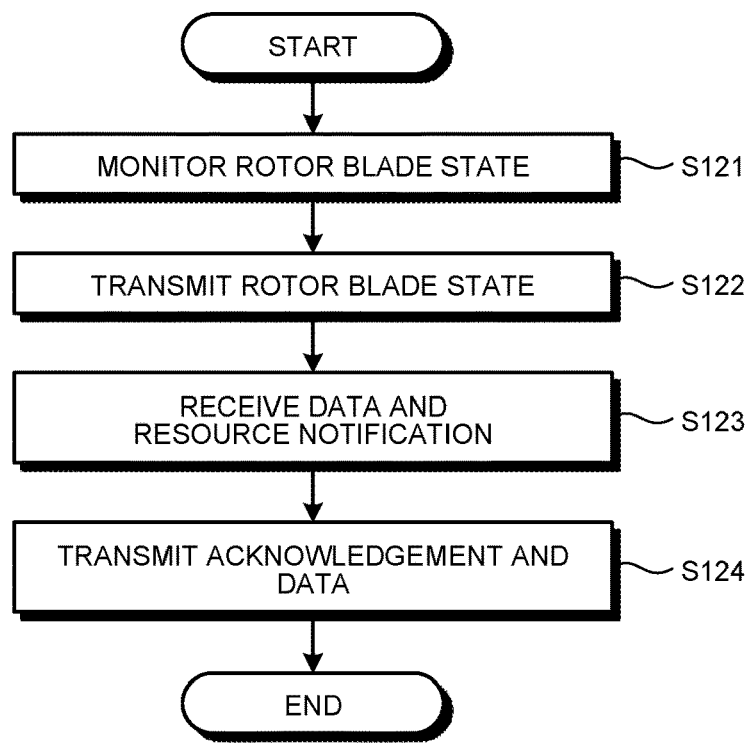
FIG. 16 is a flowchart illustrating the operation of the terminal according to the second embodiment.

FIG. 16 is a flowchart illustrating the operation of the terminal 10a according to the second embodiment. In the terminal 10a, the rotor blade state monitoring unit 11 monitors the rotor blade state (step S121). The transceiver 12 transmits the rotor blade state to the base station 30a (step S122). The transceiver 12 receives data and resource notification from the base station 30a (step S123). The data processing unit 13 transmits an acknowledgement to the data to the base station 30a via the transceiver 12, and transmits data using radio resources allocated by the resource notification (step S124).

Figure 17:
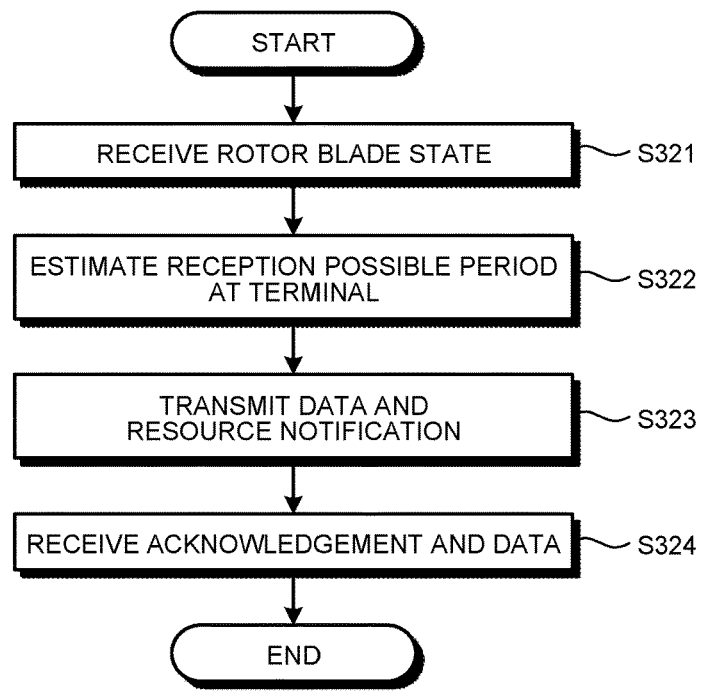
FIG. 17 is a flowchart illustrating the operation of the base station according to the second embodiment.

FIG. 17 is a flowchart illustrating the operation of the base station 30a according to the second embodiment. In the base station 30a, the transceiver 32 receives the rotor blade state from the terminal 10a (step S321). The transmission control unit 31 estimates a reception possible period at the terminal 10a (step S322). The transceiver 32 transmits data so that the terminal 10a can receive the data in the reception possible period, and transmits resource notification when a resource request for a return link has been received from the terminal 10a (step S323). The transceiver 32 receives an acknowledgement to the transmitted data and data from the terminal 10a (step S324).

Figure 18:
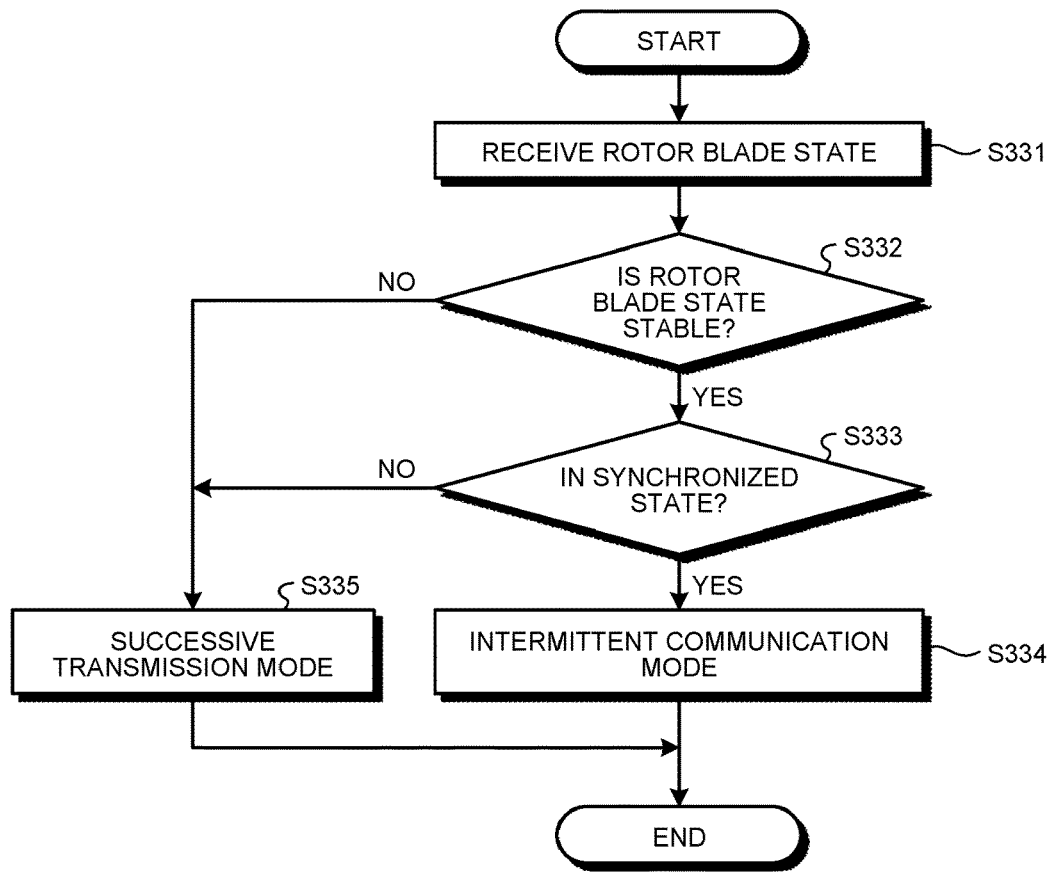
FIG. 18 is a flowchart illustrating another example of the operation of the base station according to the second embodiment.

Note that the base station 30a may perform control combining the intermittent transmission and reception method described in the present embodiment with the successive transmission method described in the first embodiment. FIG. 18 is a flowchart illustrating another example of the operation of the base station 30a according to the second embodiment. In the base station 30a, the transceiver 32 receives the rotor blade state from the terminal 10a (step S331). The transmission control unit 31 determines whether or not the rotor blade state is stable (step S332). The transmission control unit 31 determines the stability of the rotor blade state by, for example, comparing the variance of the blocking rate, the blocking cycle, or the like with a predetermined threshold. When the rotor blade state is stable (step S332: Yes), the synchronizer 34 determines a synchronization state between the base station 30a and the terminal 10a (step S333). When the base station 30a and the terminal 10a are in a synchronized state (step S333: Yes), the transceiver 32 determines that the intermittent communication control described in the second embodiment is possible, and applies the intermittent communication mode (step S334). When the rotor blade state is not stable (step S332: No) or when the base station 30a and the terminal 10a are not in a synchronized state (step S333: No), the transceiver 32 determines that the successive transmission control described in the first embodiment is possible, and applies the successive transmission mode (step S335). Thus, when the rotor blade state is stable and synchronization with the terminal 10a is established, the transceiver 32 transmits data to the terminal 10a so that the terminal 10a can receive the data during the communication possible period. Otherwise, the transceiver 32 successively transmits data to the terminal 10a.

Figure 19:
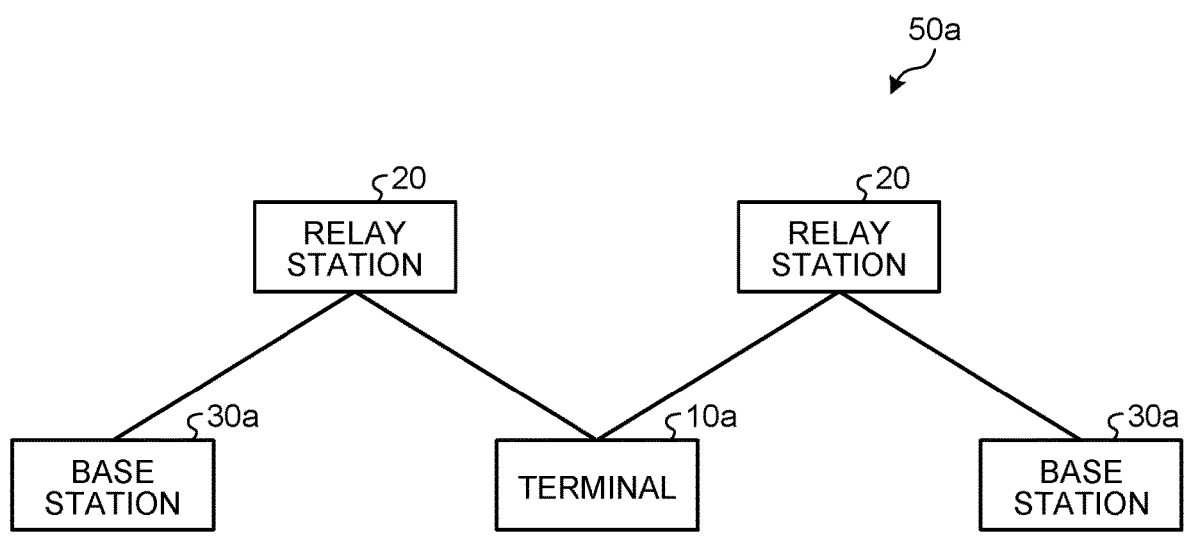
FIG. 19 is a diagram illustrating a configuration example of a communication system according to the second embodiment.

As illustrated in FIG. 19, when there are a plurality of relay stations 20 and a plurality of base stations 30a with which the terminal 10a can communicate, the terminal 10a may monitor the rotor blade state for the plurality of relay stations 20 and transmit the individual rotor blade state to the respective base stations 30a. FIG. 19 is a diagram illustrating a configuration example of a communication system 50a according to the second embodiment. The communication system 50a includes the terminal 10a, two relay stations 20, and two base stations 30a. When the terminal 10a can communicate with different base stations 30a via different relay stations 20, in the terminal 10a, the rotor blade state monitoring unit 11 monitors the rotor blade state for each base station 30a. The transceiver 12 sets the base station 30a with which the rotor blade state is the most stable and the terminal 10a is in synchronization, as a communication target. Consequently, the terminal 10a can improve frequency utilization efficiency and communication reliability. In FIG. 19, the numbers of the relay stations 20 and the base stations 30a are two, which is an example. The numbers of the relay stations 20 and the base stations 30a may be three or more.

As described above, according to the present embodiment, the terminal 10a includes the synchronizer 14, and the base station 30a includes the synchronizer 34. In a state where the terminal 10a and the base station 30a are time-synchronized, the terminal 10a transmits the rotor blade state associated with slot numbers to the base station 30a. The base station 30a performs communication only in rotor-blade non-blocking intervals in the same manner as in intermittent communication. Furthermore, the base station 30a can control switching between the intermittent communication mode and the successive transmission mode, based on the stability of the rotor blade state, the synchronization state, etc. Consequently, the terminal 10a and the base station 30a can improve the reliable transmission of signals, for example, data, resource notification, etc. while preventing redundant radio resource allocation even under conditions where blockage by the rotor blades occurs. In the second embodiment, the terminal 10a and the base station 30a can improve frequency utilization efficiency as compared with the terminal 10 and the base station 30 of the first embodiment.

The terminal according to the present disclosure achieves the effect of being capable of improving the reliable transmission of signals under conditions where blocking by the rotor blades occurs in wireless communication using time-division multiplexing.

The configurations described in the above embodiments illustrate an example and can be combined with another known art. The embodiments can be combined with each other. The configurations can be partly omitted or changed without departing from the gist.

What is claimed is:

1. A terminal to be installed in a machine having rotor blades in a communication system in which the terminal and a base station transmit and receive data via a relay station to and from each other, the terminal comprising:
   rotor blade state monitoring circuitry to monitor a rotor blade state by measuring timing at which the rotor blades block a communication path in midair between the relay station and the terminal; and
   a transceiver to transmit the rotor blade state to the base station and transmit the data using radio resources allocated by the base station.

2. The terminal according to claim 1, wherein
   the transceiver checks the data received for duplication and discards the data that is a duplicate of the received data.

3. The terminal according to claim 1, wherein
   when a time during which the terminal is allowed to transmit on a return link is allocated as the radio resources by the base station, the transceiver transmits the data to the base station at a time without blockage by the rotor blades during the time during which the terminal is allowed to transmit.

4. The terminal according to claim 1, wherein
the transceiver transmits, to the base station, a resource request to request radio resources for transmitting the data on a return link, and
a transmission rate requested in the resource request is a value obtained by dividing a data rate by a value obtained by subtracting a blocking rate from 1.

5. The terminal according to claim 1, wherein
the transceiver transmits, to the base station, a resource request to request radio resources for transmitting the data on a return link, and
information requested in the resource request is a value obtained by converting a transmission rate into information on a time or a frequency equivalent to the transmission rate.

6. The terminal according to claim 1, wherein
the transceiver transmits, to the base station, a resource request to request radio resources for transmitting the data on a return link, and
information requested in the resource request is a value obtained by converting a transmission rate into an amount of storage of data capable of being transmitted in a unit time.

7. The terminal according to claim 4, wherein
the transceiver multiplies the transmission rate by a correction coefficient based on stability of the rotor blade state, when a rate of blocking by the rotor blades varies depending on an attitude of the machine.

8. The terminal according to claim 5, wherein
the transceiver multiplies the transmission rate by a correction coefficient based on stability of the rotor blade state, when a rate of blocking by the rotor blades varies depending on an attitude of the machine.

9. The terminal according to claim 6, wherein
the transceiver multiplies the transmission rate by a correction coefficient based on stability of the rotor blade state, when a rate of blocking by the rotor blades varies depending on an attitude of the machine.

10. A base station in a communication system in which a terminal to be installed in a machine having rotor blades and the base station transmit and receive data to and from each other via a relay station, the base station comprising:
a transceiver to receive, from the terminal, a rotor blade state that is a result of measurement by the terminal of timing at which the rotor blades block a communication path in midair between the relay station and the terminal; and
transmission control circuitry to determine radio resources to be allocated to the terminal, using the rotor blade state.

11. The base station according to claim 10, wherein
the transmission control circuitry determines a number of successive transmissions for which data to be transmitted on a forward link is duplicated and successively transmitted, and
the transceiver successively transmits the data to the terminal for the number of successive transmissions.

12. The base station according to claim 11, wherein
the transmission control circuitry determines the number of successive transmissions so that a time of blocking by the rotor blades is smaller than a value obtained by multiplying a length of a radio frame for transmitting the data by the number of successive transmissions.

13. The base station according to claim 11, wherein
the transmission control circuitry determines the number of successive transmissions so that a value obtained by subtracting, from 1, a value represented by a power with a rate of blocking by the rotor blades as a base and the number of successive transmissions as an exponent is greater than a desired error rate.

14. The base station according to claim 11, wherein
the transmission control circuitry corrects the number of successive transmissions by multiplying the number of successive transmissions by a correction coefficient, based on stability of the rotor blade state.

15. The base station according to claim 11, wherein
the transceiver duplicates and transmits an Internet Protocol packet for the number of successive transmissions.

16. The base station according to claim 11, wherein
the transceiver stops successively transmitting the data when the transceiver receives an acknowledgement to the data from the terminal while successively transmitting the data.

17. The base station according to claim 11, wherein
DL_REPETITION_NUMBER defined in the 3rd Generation Partnership Project is set as the number of successive transmissions.

18. The base station according to claim 11, wherein
the transceiver duplicates and successively transmits a PLFRAME defined in Digital Video Broadcasting-Satellite-Second Generation or Digital Video Broadcasting-Satellite-Second Generation Extensions for the number of successive transmissions.

19. The base station according to claim 10, wherein
the transmission control circuitry determines, as the radio resources, a time during which the terminal is allowed to transmit on a return link, and
the transceiver transmits the radio resources as resource notification to the terminal.

20. The base station according to claim 10, wherein
the rotor blade state includes at least one of a blocking rate, a blocking cycle, and temporal stability of a blocking time.

* * * * *